United States Patent
Wurden

Patent Number: 5,861,625
Date of Patent: Jan. 19, 1999

[54] IMAGING BOLOMETER

[75] Inventor: Glen A. Wurden, Los Alamos, N. Mex.

[73] Assignee: The Regents of the University of California, Los Alamos, N. Mex.

[21] Appl. No.: 857,470

[22] Filed: May 15, 1997

[51] Int. Cl.[6] .................................................. G01J 5/00
[52] U.S. Cl. ...................................... 250/338.1; 250/330
[58] Field of Search .................................. 250/332, 330, 250/338.1

[56] References Cited

U.S. PATENT DOCUMENTS 3,073,957  1/1963  Jones ........................................ 250/330

FOREIGN PATENT DOCUMENTS 1429710 (A1)  11/1993  U.S.S.R. ............................. 250/338.1

OTHER PUBLICATIONS

G.A. Wurden, "A Rad–Hard, Steady–State, Digital Imaging Bolometer System For ITER," *Diagnostics for Experimental Thermonuclear Fusion Reactors*, edited by P.E. Stott et al. (Plenum Press, New York, Mar., 1996), pp. 603–606.

*Primary Examiner*—Constantine Hannaher
*Attorney, Agent, or Firm*—Samuel M. Freund

[57] ABSTRACT

Radiation-hard, steady-state imaging bolometer. A bolometer employing infrared (IR) imaging of a segmented-matrix absorber of plasma radiation in a cooled-pinhole camera geometry is described. The bolometer design parameters are determined by modeling the temperature of the foils from which the absorbing matrix is fabricated by using a two-dimensional time-dependent solution of the heat conduction equation. The resulting design will give a steady-state bolometry capability, with approximately 100 Hz time resolution, while simultaneously providing hundreds of channels of spatial information. No wiring harnesses will be required, as the temperature-rise data will be measured via an IR camera. The resulting spatial data may be used to tomographically investigate the profile of plasmas.

7 Claims, 1 Drawing Sheet

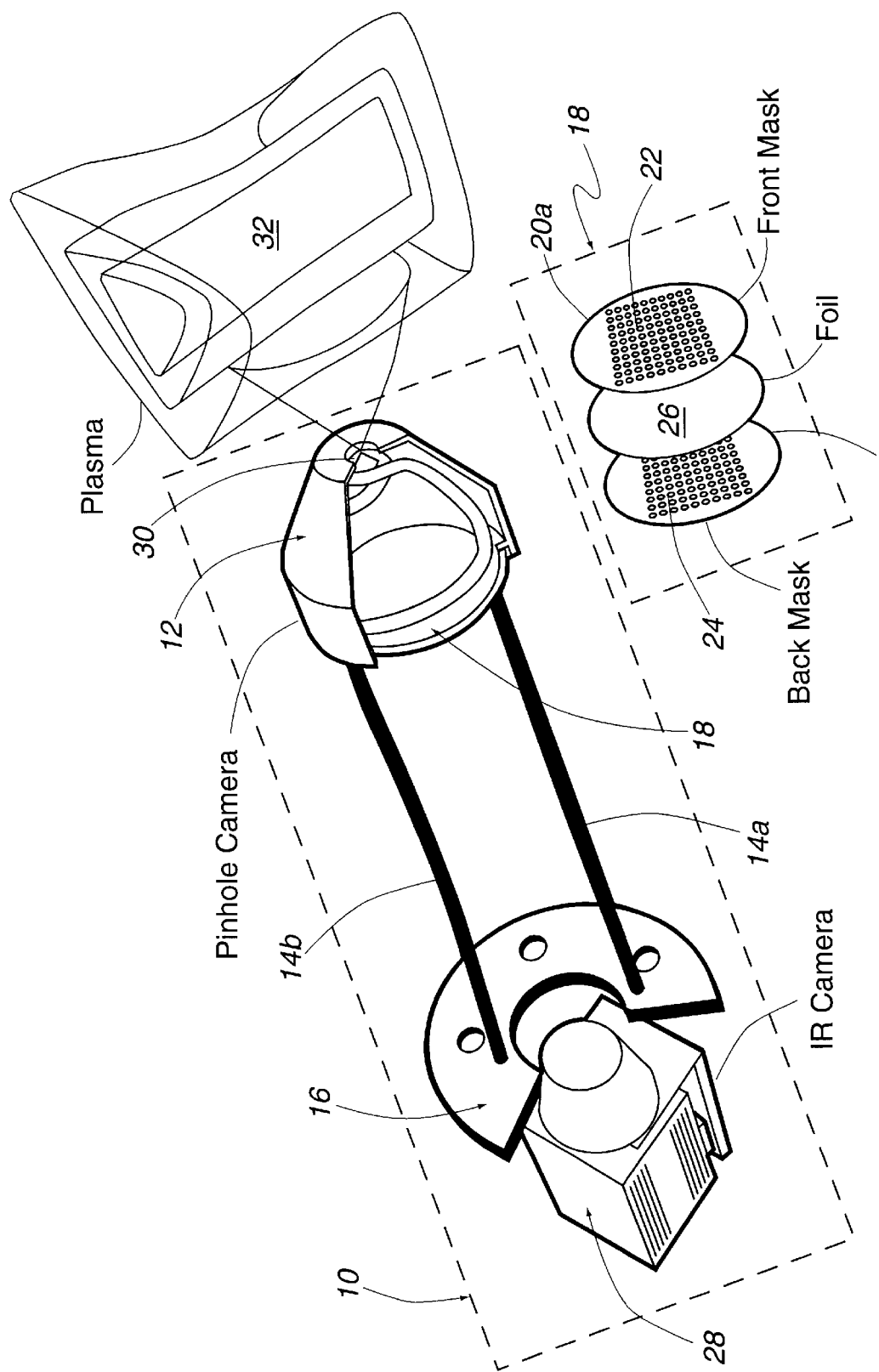

IMAGING BOLOMETER

STATEMENT REGARDING FEDERALLY SPONSORED RESEARCH OR DEVELOPMENT

The invention was made with Government support under Contract No. W-7405-ENG-36 awarded by the U.S. Department of Energy to The Regents of the University of California. The Government has certain rights in this invention.

FIELD OF THE INVENTION

The present invention relates generally to bolometers and, more particularly, to a radiation-hard imaging bolometer which uses a segmented-absorber matrix, combined with a pinhole-camera geometry and a sensitive infrared camera.

BACKGROUND OF THE INVENTION

Bolometers are a standard magnetic fusion plasma diagnostic. However, it is problematic to have a sufficient number of channels and views to accurately reconstruct the plasma radiation profile. In addition, every discrete detector channel generally has 2–4 wire leads for carrying low-level signals away from the plasma and through a vacuum interface, typically resulting in complicated wiring harnesses inside high-temperature, high-nuclear-radiation environment devices, and leading to high cost and complexity.

Current bolometry for fusion plasmas employs discrete thin-foils which are heated by plasma radiation, and the resulting temperature rise is detected by a metal resistor or thermistor bonded to the back side of the foil, often separated by an insulating film. Occasionally, a single-channel infrared (IR) detector has been used to monitor the rise in temperature of the foil, so as to provide better electrical noise immunity. In the case of short-pulse plasma radiation, or when studying the energy deposited by ion, neutral, or electron beam, IR imaging of the back side of a foil or plate target has been employed for determining the instantaneous distribution of energy in the beam. The difficulty with using this technique to observe a long-pulse plasma, is that the lateral heat flow in the foil or plate interferes with subsequent images and confuses the measurement. In addition, a foil which is sufficiently thin to have reasonable time response must be cooled for longer time intervals in order to prevent melting or radiation damage, or nonlinear effects from adversely affecting the measurement. Finally, the detectors must be radiation hardened in order to survive the neutron and gamma fluences from a long-pulse DD or DT machine. So-called "silicon bolometers" and pyroelectric detectors have the advantage of responding directly to the incident power; however, such detectors will not work in these harsh environments.

Plasmas often have complex geometry, and multichannel imaging (as well as tomography) is desired for modeling analysis. A radiation-hard imaging bolometer, using a segmented-absorber matrix, combined with a pinhole-camera geometry and sensitive IR camera has recently been proposed. Such an apparatus would generate several thousand channels of data, while eliminating wires crossing vacuum interfaces.

In "A Rad-Hard, Steady-State, Digital Imaging Bolometer System For ITER," by G. A. Wurden, in *Diagnostics for Experimental Thermonuclear Fusion Reactors*, edited by P. E. Stott et al. (Plenum Press, New York, March, 1996), pp. 603–606, a pinhole imaging design, with the plasma radiation striking a compact, segmented, rear-surface-cooled "foil," where each segment of the "foil" corresponds to one imaging resolution element or "pixel," is described. Each pixel absorber is raised from the back cooling block (which may be held at a constant reference temperature), and the height of the pixels (and the material thermal conductivity) is adjusted for rapid axial heat flow compared to the relatively longer lateral heat flow path between pixels. The passive absorber matrix is imaged in the infrared, using two metal mirrors, which allows a neutron-sensitive, state-of-the-art, 12-bit digital video IR camera to be positioned out of the line-of-sight of the neutron flux from the plasma. Some of the pixels may be positioned outside of the plasma field-of-view, to act as "background" pixels, if required. The front surface of the absorbing matrix may initially be a "blackened coating" (in accordance with common bolometer design). However, during use, plasma contamination of the surface occurs. No wires exit the vacuum interface. A schematic representation of the bolometer apparatus is shown in FIG. 2 of Wurden. Design parameters are given for an aluminum absorbing matrix having aluminum pixels, although different absorbing materials may be bonded to the end of each pixel according to the teachings of Wurden.

Wurden identifies a potential difficulty in the use of the apparatus as being due to infrared radiation from hot objects (500°–1000° C. hotter than the segmented matrix in the bolometer itself) directly in the field of view. These objects will radiate approximately 1000 times more strongly than the thermal emission from the matrix in the 3–5 $\mu$m region, due to blackbody emission. This stray light interferes with the light viewed from the front surface of the segmented matrix. Two suggestions are made for overcoming this difficulty. First, the matrix itself could be operated at elevated temperatures. Additionally, the matrix could be viewed from its back surface, while cooling is applied to the sides of each pixel. No teachings are provided as to how either of these suggestions might be accomplished.

Accordingly, it is an object of the present invention to provide a bolometer for infrared spatial imaging of plasmas which is unaffected by stray light emission from hot surfaces surrounding the plasma.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the bolometer for imaging plasmas hereof may include a segmented matrix which includes a metal foil, having one face exposed to the radiation emitted from the plasma, sandwiched between and in thermal contact with a first thermally conducting mask located closest to the plasma and a second thermally conducting mask, the two masks having an aligned array of holes which define absorbing segments of the foil, and means for cooling the masks such that they act as a heat sink for the foil segments exposed to the radiation from the plasma; a body, interposed between the radiation emitted from the plasma and the segmented matrix, having a pinhole through which radiation emitted from the plasma is imaged onto the matrix through the first mask; and an infrared camera, located such that the segmented matrix blocks radiation from the plasma from impinging on the camera, for viewing infrared emission from the absorbing segments of the foil through the second mask and detecting the change in temperature of the absorbing segments resulting from heating by the incident radiation from the plasma.

Preferably, the foil and the masks are planar.

It is also preferred that the face of the foil exposed to the plasma radiation is oriented perpendicular to the radiation flow.

Benefits and advantages of the present invention include high-resolution imaging of plasmas without interference from hot bodies in the vicinity of the plasma.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1a is a schematic representation of a perspective view of the proposed bolometer of the present invention, showing the pin-hole camera head, the segmented matrix absorber, and the infrared camera thereof.

FIG. 1b is a schematic representation of an exploded view of the segmented matrix absorber, showing the foil and the front and rear masks thereof.

DETAILED DESCRIPTION

Briefly, the present invention includes a bolometer having a radiation absorber with fast time resolution, good sensitivity, long-term cooling, and the ability to image a radiation source. A segmented matrix consisting of a thin metal foil sandwiched between two metal masking sheets drilled with matching arrays of holes which permit portions of both sides of the foil to be exposed is employed as the radiation absorber. The radiation source is imaged through a pinhole onto one side (the front side) of the matrix. The change in temperature resulting from the incident radiation is detected by an infrared camera which views the matrix from the side opposite the pinhole (back side) through an infrared-transmitting vacuum window (in the event that the body containing the pinhole and the radiation absorber are located within the confinement container of the plasma). The foil is constructed from a material having low thermal conductivity and the foil thickness is chosen such that high sensitivity can be achieved. The metal masking sheets are fabricated from high-thermal-conductivity material which, when water cooled, act as a heat sink for the exposed foil portions. This prevents lateral heat flow from affecting adjacent pixels, and prevents melting during long-pulse plasma operation. The body which contains the pinhole is also cooled to reduce the stray infrared radiation from reaching the foil.

The imaging bolometer is intended to provide radial and/or tangential views of a plasma operating at radiation levels between 1 and 30 MW, with a duration time between 10 ms and near steady-state. Assuming 100% radiated power, for a 3 MW, 27 m$^3$ volume plasma, the average plasma power density is only 0.11 W/cm$^3$. Therefore, it is essential to locate the bolometer as close to the plasma as possible. Compared with Wurden, supra, the more complicated "back-viewed and side-cooled" geometry matrix of the present invention sacrifices some time resolution for superior spatial coverage in steady-state operation.

The choice of foil material depends on the expected heat load, the desired temperature rise, the foil's opacity to the expected radiation, and the required time response. To model the transient temperature rise time, a time-dependent solution to the heat conduction equation (without radiation losses) for the cylindrical geometry of the foil segment has been used with the assumption that the foil is sufficiently thin compared to its transverse (radial) cooling dimensions, so that any time dependence of axial gradients between the front and back surfaces can be neglected. A model of an infinitely long rod (since the thickness of the foil can be ignored), having radius b, which has a volumetric heat source activated at time t=0, while the boundary of the rod is held clamped at a fixed temperature T=0° C. is used in the calculations. The incident power density is then assumed to be uniform throughout the foil. Additionally, a uniform initial condition of T=0° C. for the foil is assumed. The thermal response at the surface of the foil, as a function of time and radius from the center of the foil segment, may be calculated using the Equation:

$$T(r,t) = \frac{2}{b} \cdot \frac{Sf}{k \cdot th} \sum_{m=1}^{\infty} \left[ \frac{J_0(\beta_m \cdot r)}{J_1(\beta_m \cdot b)} \cdot \frac{1 - \exp[-\kappa \, (\beta_m)^2 \cdot t]}{(\beta_m)^3} \right],$$

where k is the thermal conductivity, $\kappa$ is the thermal diffusivity, Sf is the incident power flux (W/cm$^2$) and the $\beta_m$'s are the m$^{th}$ J$_o$ Bessel function roots normalized by b, arising from the cylindrical geometry. Using this model, the foil radius, b, and the foil thickness, th, are adjusted for various metals to arrive at an optimum set of design parameters. The thermal parameters for different metals are set forth in *Basic Heat Transfer*, by F. Kreith and W. Z. Black (Harper and Row, New York, 1980), Appendix E, pp. 508–513. From these values, the rise time and temperature for various foils are calculated from the Equation and set forth in Table I, where the material parameters are given for 20° C. starting temperature (which does not change appreciably), and the rise time is for 50% of the final temperature rise, for a 1.5 mm diameter, 2-$\mu$m thick foil segment, assuming a 3 MW plasma radiation source, with a 9.9-mm-diameter pinhole in a 55° FOV pinhole camera located 2 m distance from the plasma axis.

TABLE I

| Foil material | p density (gm/cm$^3$) | K conductivity (W/[cm °C.]) | $\kappa$ diffusivity (cm$^2$/s) | Q · δt/[C$_p$ · p · V] δt = 17 ms (milli °C.) | ΔT final cooled (milli °C.) | $\tau$ rise time (ms) |
|---|---|---|---|---|---|---|
| Bismuth | 9.78 | 0.079 | 0.065 | 275 | 306 | 15 |
| SS 304 | 7.817 | 0.144 | 0.0387 | 92 | 195 | 20 |
| Titanium | 4.5 | 0.219 | 0.08 | 121 | 128 | 10 |
| Nickel | 8.91 | 0.909 | 0.229 | 84 | 31 | 3.5 |
| Aluminum | 2.7 | 2.37 | 0.975 | 138 | 12 | 0.8 |

TABLE I-continued

| Foil material | p density (gm/cm³) | K conductivity (W/[cm °C.]) | κ diffusivity (cm²/s) | Q · δt/[C$_p$ · p · V] δt = 17 ms (milli °C.) | ΔT final cooled (milli °C.) | τ rise time (ms) |
|---|---|---|---|---|---|---|
| Gold | 19.3 | 3.16 | 1.27 | 134 | 9 | 0.55 |
| Copper | 8.9 | 3.99 | 1.166 | 98 | 7 | 0.6 |

Materials having fast rise times (good heat transfer properties) give rise to small temperature increases relative to the uncooled case (for one video field time δt=17 ms); that is, the temperature rise for a 17 ms burst of heat incident on a free-standing, non-cooled foil. The last three columns of Table 1 are the "uncooled temperature rise," "the final temperature rise of the foil center assuming the edge of the foil is held fixed," and "the time to 50% rise in temperature (relative to the final asymptotic value from the previous column)," respectively. Bismuth has been selected for the foil material due to its low thermal conductivity and heat capacity, resulting in higher thermal sensitivity to incident power. The resulting foil segment parameters are b=0.75 mm and th=2 μm. For bismuth, this gives a temperature rise of 0.36° C. with a rise time of 15 ms, which matches the time resolution of the IR camera and exceeding its temperature sensitivity by a factor of about 15. The spatial resolution of the imaged plasma is 13 cm, and derives principally from the 1-cm-diameter pinhole. The rise time is also dependent on the "distance" to the cooling means (radial dimension of each foil), and can be increased if larger foils are employed, even for a "fast" material such as copper.

Table II shows the foil diameter necessary to achieve a temperature rise time equal to the camera time resolution (τ=15 ms) for a 2-μm-thick edge-cooled foil of various materials, as well as the resulting maximum temperature. Materials with faster heat conductance require a larger distance to the boundary to maintain the same temperature rise-time constraint. Larger diameter foils can be matched to a larger diameter pinhole, which places a higher power density on each foil segment.

TABLE II

| Foil material | ΔT final cooled (milli °C.) | Pinhole diameter (mm) | Foil diameter (mm) | No. of macro pixels |
|---|---|---|---|---|
| Bismuth | 306 | 9.9 | 1.5 | 16 × 16 |
| SS 304 | 146 | 10.1 | 1.3 | 16 × 16 |
| Titanium | 184 | 9.6 | 1.8 | 16 × 16 |
| Nickel | 124 | 8.5 | 3.0 | 16 × 16 |
| Aluminum | 484 | 13.1 | 6.0 | 10 × 10 |
| Gold | 494 | 12.2 | 7.0 | 10 × 10 |
| Copper | 390 | 12.2 | 7.0 | 10 × 10 |

From this comparison it may be observed that bismuth has the most desirable properties, since it has a large temperature rise for a reasonably sized foil segment. Similarly sized Titanium and 304 Stainless Steel foils would provide about half the temperature rise. A nickel foil would require a diameter of approximately twice that for bismuth for about one third of the temperature rise, when its diameter is chosen to force the same rise time. Gold, aluminum, and copper yield slightly larger temperature rises than does bismuth, but at the expense of only 20 cm spatial resolution in the plasma, due to the available space for fewer "foil segments." The number of segments is constrained by the available transverse size for the diagnostic, which is coupled to port and flange dimensions or, ultimately, to the number of resolution elements in the IR camera. It has been found that bismuth foil readily oxidizes. Therefore, it is anticipated that either 1 μm thick gold will be used as a replacement, or the 2 μm thick bismuth foil will be overcoated on each side with approximately 1000 Angstroms of gold. It is expected that the overcoating will not change the desirable thermal properties of the bismuth foil.

In order to obtain a sufficiently wide field-of-view (FOV) of the plasma, and also to obtain a high power loading on the foil (to be able to resolve the ΔT with the IR cameras presently available), the pinhole camera head must be used in a reentrant configuration.

Reference will now be made in detail to the present preferred embodiment of the invention, an example of which is illustrated in the accompanying drawings. Identical or similar structure is identified using identical callouts. Turning now to the drawings, FIG. 1a is a schematic representation of a perspective view of the proposed bolometer, 10, of the present invention. Pinhole camera head, 12, is water cooled by water flow through copper support tubes, 14a, b, which also connect the pinhole camera head 12 to base, 16. Base 16 may be a flange for introducing the forward portion of the present apparatus into a containment vessel for the plasma. Two additional supports (fabricated from stainless steel, and not shown in the Figure) are intended to be employed for connecting the camera head and the base for increased mechanical rigidity. No in-vessel welds or connections in the cooling line are intended in order to reduce the possibility of a water leak. FIG. 1b is a schematic representation of an exploded view of the segmented matrix absorber, 18, of bolometer 10. Front and rear planar masks, 20a and 20b, respectively, will be fabricated from oxygen-free, high-conductivity copper (OFHC) sheets (~2 mm thick), with an appropriate (16×16, for example) number of 0.13 in. diameter holes, 22, 24, respectively, to form the segmented matrix. Holes 22 and 24 are aligned such that light would readily pass therethrough if planar sensor foil, 26, were not disposed therebetween. The exact hole pattern is unimportant, but hole diameter and number are interrelated in that the desired plasma-viewing resolution is dependent on these two parameters. Foil 26 is sandwiched between masks 20a and 20b such that excellent thermal contact is achieved between each mask and the foil. The relatively thick copper provides the thermal isolation between adjacent "macropixels" or foil segments. It is important to note that hole diameter is adjusted to control the rate of cooling of the foil. That is, the larger the hole, the greater the distance to the cooling mask and, consequently, a longer thermal decay time for a given foil type. To simplify construction, sensor foil 26 will be a single continuous sheet, having a thickness between 1 and 5 μm. The foil masks and, consequently the foil sensor, are cooled by thermal contact with the cooled pinhole camera head 12. Infrared camera (a 256×256 element InAs array), 28, will have a FOV of 2.23° when used in conjunction with a commercially available 250 mm lens, which gives a 10-cm-wide view of the back copper mask 20b from a focal distance of 2.6 m. The lens (not shown in the FIG. 1a) is mounted on the IR camera and is selected to render compatible the active area of the segmented matrix absorber and the IR-sensitive portion of the camera. The exact nature of the lens is unimportant. If a circuitous optical path for the IR photons were to be required in order to protect the camera from, say, a high neutron flux, a relay periscope would be employed in place of the simple lens. Commercially available, state-of-the-art, 12-bit digital video infrared (IR) cameras have a temperature resolution of approximately ±0.01° C. with a frame rate of about 1 kHz. A camera having ±0.025° C. resolution and 60 Hz frame rate has been tested in magnetic fields of 0.01–0.06 T with no performance impairment. It operates in the 3–5 $\mu$m infrared band. Expected foil temperature increases will be small, and the nominal operating temperature will be elevated slightly above room temperature.

The pinhole, 30, diameter in the pinhole-camera head will be 9.9 mm which, at a minor radius of 2.0 m from plasma, 32, gives a power flux of 4.0 mW/cm$^2$ at the foil location 26, assuming a flat 100% radiation profile from a 3 MW plasma 32. These conditions are matched to a foil segment having a diameter of 1.5 mm for bismuth using the Equation, and a 16×16 array is determined to fit within the IR camera's 10-cm-wide FOV, with a substantial mass of copper between each foil segment for thermal isolation and cooling. The nonuniform temperature on the face of each foil segment will be mapped to 5 pixels on the IR camera. For the 15 ms time constant and pinhole diameter described above, the detection limit will be approximately 250 $\mu$W/cm$^2$ using a commercially available IR camera, and about 2.5 times smaller using a state-of-the-art ±0.01° C. resolution IR system. For monitoring the thermal drift of the copper masks, either foil segments that are not used to image the plasma, or a conventional thermocouple, or both, might be used. It is preferred that the face of the foil exposed to the plasma radiation be oriented approximately perpendicular to the radiation flow in order that an accurate image of the plasma is recorded by the IR camera.

Recent advances in infrared imaging technology make it possible to use remote-sensing techniques to monitor small temperature changes in a segmented foil, and a simple, multichannel diagnostic to image the radiation emitted by complex geometry plasmas may be constructed. In situations involving severe neutron and gamma environments and difficult access for conventional wiring harnesses, a metal mirror transport array for bringing the IR image out of a plasma enclosure to a protected location where the sensitive (and expensive) solid-state IR camera is located is envisioned.

The foregoing description of the invention has been presented for purposes of illustration and description and is not intended to be exhaustive or to limit the invention to the precise form disclosed, and obviously many modifications and variations are possible in light of the above teaching. For example, the foils and masks of the segmented matrix absorber need not be planar. A useful geometry for the absorber would be semi-circular, where the distance from each point on the absorber to the pinhole would be constant.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An bolometer for imaging plasmas, which comprises in combination:

a. a segmented matrix comprising a metal foil having one face thereof exposed to radiation emitted from the plasma and disposed between and in thermal contact with a first thermally conducting mask closest to the plasma and a second thermally conducting mask, said first mask and said second mask having an aligned plurality of holes therethrough which define absorbing segments of said foil, and means for cooling said first mask and said second mask such that said first mask and said second mask act as a heat sink for the foil segments exposed to the radiation from the plasma;

b. a body interposed between the radiation emitted from the plasma and said segmented matrix having a pinhole through which radiation emitted from the plasma is imaged onto said segmented matrix through said first mask; and c. an infrared camera, located such that said segmented matrix blocks radiation from the plasma from impinging thereon, for viewing infrared emission from the absorbing segments of said foil through said second mask and detecting the change in temperature of the absorbing segments resulting from the heating thereof by the incident radiation from the plasma.

2. The bolometer for imaging plasmas as described in claim 1, wherein said foil, said first mask, and said second mask are substantially planar.

3. The bolometer for imaging plasmas as described in claim 2, wherein the exposed face of said foil is oriented substantially perpendicular to the radiation flow from the plasma.

4. The bolometer for imaging plasmas as described in claim 1, further comprising means for cooling said body having the pinhole such that unwanted infrared radiation from said body impinging on the absorbing segments of said foil is reduced.

5. The bolometer for imaging plasmas as described in claim 1, wherein said first mask and said second mask are fabricated from highly thermally conductive metal.

6. The bolometer for imaging plasmas as described in claim 1, wherein the thickness and material of construction of said foilare chosen to match the rise time and sensitivity of said infrared camera.

7. The bolometer for imaging plasmas as described in claim 6, wherein said material of construction of said foil is bismuth.

* * * * *